US012704112B2

(12) United States Patent
Hawkins et al.

(10) Patent No.: US 12,704,112 B2
(45) Date of Patent: Aug. 11, 2026

(54) AUXILIARY POWER SUPPLY

(71) Applicant: Siemens Gamesa Renewable Energy A/S, Brande (DK)

(72) Inventors: Samuel Hawkins, Vejle (DK); Rene Salkvist Nielsen, Sunds (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 0 days.

(21) Appl. No.: 18/729,036

(22) PCT Filed: Dec. 29, 2022

(86) PCT No.: PCT/EP2022/088020
§ 371 (c)(1),
(2) Date: Jul. 15, 2024

(87) PCT Pub. No.: WO2023/143852
PCT Pub. Date: Aug. 3, 2023

(65) Prior Publication Data

US 2025/0067247 A1 Feb. 27, 2025

(30) Foreign Application Priority Data

Jan. 28, 2022 (EP) .................................... 22153883

(51) Int. Cl.
*F03D 9/11* (2016.01)
*F03D 9/25* (2016.01)
*F03D 80/80* (2016.01)

(52) U.S. Cl.
CPC .................. *F03D 9/11* (2016.05); *F03D 9/25* (2016.05); *F03D 80/821* (2023.08); *F05B 2220/706* (2013.01)

(58) Field of Classification Search
CPC .......... F03D 9/11; F03D 13/30; F03D 80/003; F05B 2260/42; F05B 2260/76; F05B 2270/107
(Continued)

(56) References Cited

U.S. PATENT DOCUMENTS

2007/0013194 A1* 1/2007 Calley .................... F03D 7/047 290/44
2012/0056425 A1 3/2012 Cousineau
(Continued)

FOREIGN PATENT DOCUMENTS

DE 102009017244 A1 10/2010
EP 2282055 A2 2/2011
WO 2010109262 A2 9/2010

OTHER PUBLICATIONS

PCT International Search Report and Written Opinion of International Searching Authority mailed Mar. 16, 2023 corresponding to PCT International Application No. PCT/EP2022/088020 filed Dec. 29, 2022.

(Continued)

*Primary Examiner* — Charles Reid, Jr.
(74) *Attorney, Agent, or Firm* — Schmeiser Olsen PLLC

(57) ABSTRACT

An auxiliary power supply arrangement of a wind turbine is provided including a standby power supply configured to cover the average power requirements of auxiliary devices of the wind turbine; and an energy storage unit, which energy storage unit is configured to cover transient power requirements of the auxiliary devices and/or to supplement the standby power supply in covering the transient power requirements of the auxiliary devices. Also provided is a wind turbine including such an auxiliary power supply arrangement adapted to supply power to auxiliary devices of
(Continued)

the wind turbine during an off-grid state of the wind turbine; and a method of operating such a wind turbine.

18 Claims, 8 Drawing Sheets

(58) Field of Classification Search
USPC ........................................................ 290/44, 55
See application file for complete search history.

(56) References Cited

U.S. PATENT DOCUMENTS

2013/0127164 A1* 5/2013 Pena ......................... G05F 1/10 290/2
2013/0175801 A1* 7/2013 Matzen ..................... H02P 9/10 290/44
2013/0264882 A1* 10/2013 Abasolo .................. F03D 9/255 307/80
2014/0277791 A1* 9/2014 Lenard .................... F02D 29/06 700/287
2016/0111918 A1* 4/2016 Benson ................... B60L 53/00 307/23
2021/0281080 A1* 9/2021 Danielsen ............... H02J 3/381

OTHER PUBLICATIONS

International Preliminary Report on Patentability for PCT/EP2022/088020 mailed on Apr. 16, 2024.
KVA and Its Importance in Battery Systems, URL:< https://www.batteryskills.com/how-to-calculate-battery-kva/>; retrieved Jun. 4, 2025.
Supercapacitor; URL:< https://en.wikipedia.org/wiki/Supercapacitor>; retrieved Jun. 4, 2025.

* cited by examiner 2
20
2aux
2aux
21
2aux
1
22
IE
220
1S
11
23

10
11
1S
2aux
1E 2
8aux
8aux
8aux
8S $M_{ongrid}$
$M_{offgrid}$
$90_{trans}$
$90_{trans}$
$90_{trans}$
$90_{trans}$
90
$\Delta P$
$P_{trans}$
$P_{stst}$ 2
1E
1
1S

AUXILIARY POWER SUPPLY

CROSS-REFERENCE TO RELATED APPLICATIONS

This application claims priority to PCT Application No. PCT/EP2022/088020, having a filing date of Dec. 29, 2022, which claims priority to EP Application No. 22153883.8, having a filing date of Jan. 28, 2022, the entire contents both of which are hereby incorporated by reference.

FIELD OF TECHNOLOGY

The following relates to an auxiliary power supply.

BACKGROUND

A wind turbine generally comprises various auxiliary components that require power in order to operate. For example, the yaw system of a horizontal-axis wind turbine might comprise several yaw drive units, each with a pinion that engages with the yaw ring, and a motor to turn the pinion. Similarly, motors of a pitch system are deployed to pitch about their longitudinal axes. Another example of an auxiliary device might be a cooling arrangement that comprises various motor-driven pumps to circulate a cooling fluid, a dehumidifier, a lubrication system, etc. Temporary auxiliaries can be various machines or tools required during service routines, pre-commissioning, commissioning, testing procedures etc. Generally, such auxiliaries can draw high currents of varying magnitudes, depending on the effort being expended.

In addition to the auxiliary devices realized as permanent fixtures of a wind turbine, it may be necessary to provide power for tools and equipment during installation, commissioning, maintenance, repair etc. at various stages in the lifetime of the wind turbine. To this end, a wind turbine may be provided with a system including electrical outlets or sockets for electrical tools and equipment. These power outlets or sockets may also be needed when the wind turbine is off-grid. The tools and equipment used during installation, commissioning, and maintenance stages can be the greatest power consumers.

The motor of an auxiliary device may draw high inrush currents, depending on the magnetization of the motor's windings. A high inrush current is associated with a high-amplitude burst of power for a brief duration, i.e., with low total energy.

During normal operation of the wind turbine, i.e., when the wind turbine is connected to the grid, any such auxiliary can be powered by the wind turbine generator or from the grid.

During an off-grid situation, a wind turbine may avail itself of a standby power supply, for example the accessory power component proposed in US2012056425A1. A standby power supply may be a permanent fixture of a wind turbine or may be transported to an off-grid wind turbine. The standby power supply must be specified to the highest peak current that will be drawn by an auxiliary device, and not to the "steady state" power consumption during normal operation of that auxiliary device. Power consumption peaks may be relatively rare, arising only infrequently for example when a motor-driven device is switched on, but the capacity of a standby power supply must be large enough to cope with the largest possible current peak to avoid overloading and tripping, which would result in the power supply shutting down and leaving the wind turbine without any power at all. This situation must be avoided since it is important to be able to continue basic functions such as yawing into the wind, keeping the nacelle interior temperature above freezing, maintaining a dry interior, etc. As a result, a standby power supply for an off-grid wind turbine generally has a large capacity, for example in the order of 150 kVA. A diesel generator with a rating of this order may weigh several tons and consumes large amounts of diesel fuel, creating challenges in both refueling logistics and operational costs. The costs of rental, transportation and frequent refueling of a large and heavy standby power supply can be prohibitively expensive. Furthermore, a power supply unit with the required specifications may be difficult to acquire at short notice and for the required duration. Particularly in the case of a remote or offshore wind turbine, these aspects add considerably to the operational costs of the wind turbine.

SUMMARY

An aspect relates to powering wind turbine auxiliary devices and avoiding the problems outlined above.

In the following, it shall be understood that the auxiliary power supply of a wind turbine serves to supply power to auxiliary devices of the wind turbine in the absence of any other source of power such as the grid.

According to embodiments of the invention, the auxiliary power supply arrangement comprises a standby power supply configured to supply the average power required by auxiliary devices of the wind turbine; and an energy storage unit which is configured to cover the peak power requirements of the auxiliary devices, or which is configured to supplement the standby power supply in covering the peak power requirements of the auxiliary devices.

In the context of embodiments of the invention, the "auxiliary devices of a wind turbine" include the permanent fixtures of the wind turbine itself as well as tools and equipment powered through electrical outlets of the wind turbine during stages of installation, commissioning, maintenance, etc. The expression "average power" as used herein shall be understood as the power consumed by the auxiliary devices during normal ("steady-state") operation and during peak power consumption stages (when a device is switched on, for example). Peak power consumption of a device is generally only for a short duration and has only a small influence on the average power. For this reason, the terms "average power" and "steady-state power" may be used interchangeably herein.

An advantage of embodiments of the inventive auxiliary power supply arrangement is that the standby power supply of the auxiliary power supply arrangement can be considerably smaller than a conventional art standby power supply which must—on its own—supply enough power to cover all peak power consumption situations. Because it has a relatively low capacity compared to the conventional art standby power supply, the standby power supply of embodiments of the inventive auxiliary power supply arrangement is lighter and less expensive. Furthermore, in cases where the standby power supply is not a permanent fixture or installation of the wind turbine, the relatively low-capacity standby power supply of embodiments of the inventive auxiliary power supply arrangement is easier to rent or procure at short notice, and also more economical to transport to a remote or offshore location. Because the standby power supply of embodiments of the inventive auxiliary power supply arrangement can be relatively small and light, it is easier to install at a wind turbine site.

Furthermore, since the capacity of the standby power supply of embodiments of the inventive auxiliary power supply arrangement is significantly lower than the capacity of a conventional art standby power supply, it need not be realized in the conventional manner, for example it need not be a diesel generator. Instead, the standby power supply of embodiments of the inventive auxiliary power supply arrangement can comprise any of a gas turbine, a fuel cell, a battery with low power rating and high energy content, a photovoltaic module, a wave energy converter, a compressed-air energy storage module, etc.

According to embodiments of the invention, the wind turbine comprises a number of permanently installed auxiliary devices (and possibly also a number of temporary auxiliary devices) requiring electrical power and an embodiment of the inventive auxiliary power supply arrangement to supply power to the auxiliary devices during off-grid operation of the wind turbine.

According to embodiments of the invention, the method of operating a wind turbine comprises the steps of detecting an off-grid state; controlling the standby power supply of the auxiliary power supply arrangement to cover steady-state power consumption of the auxiliary devices; and discharging the energy storage unit to cover peak power consumption of the auxiliary devices. The standby power supply and the energy storage unit can be controlled so that the energy storage unit covers the peak power requirements of the auxiliary devices, or so that the energy storage unit supplements the standby power supply in covering the peak power requirements of the auxiliary devices.

Particularly advantageous embodiments and features of embodiments of the invention are given by the dependent claims, as revealed in the following description. Features of different claim categories may be combined as appropriate to give further embodiments not described herein.

In the following, it may be assumed that a wind turbine is a horizontal-axis wind turbine with a number of rotor blades mounted to a hub, a nacelle mounted on a tower; and a generator arranged in the nacelle. The auxiliary devices of the wind turbine can be distributed according to their purpose, for example the yaw drive motors will be arranged about the top of the tower, pitch drive motors will be arranged about the rotor blade root ends, etc. In the following, without restricting embodiments of the invention in any way, it may be assumed that the wind turbine is an offshore wind turbine.

The steady-state power consumption of the permanent and/or temporary auxiliary devices of a wind turbine during a grid off-state can be determined from empirical data, from a prediction of the power consumption under known operating conditions, etc. The steady-state power consumption may be affected by variables such a frequency of alteration of wind direction (requiring frequent yaw angle corrections), ambient temperature (cold conditions require more heating), humidity (damp conditions require more air-conditioning), wind speed (high wind speed may require feathering of the rotor blades), duration of use of a particular tool or piece of equipment, etc. Generally, the power consumption over time will be around this "steady-state" power level, with intermittent power peaks when a device such as a motor suddenly draws a large quantity of current.

Regardless of how the auxiliary devices of a wind turbine are provided with power, the amplitude of the power peaks or transients determine the total power consumed by the auxiliaries. The capacity of a conventional art standby power supply must cover both average (steady-state) power consumption as well as peak (transient) power consumption and may be considered as the reference capacity against which the capacities of the standby power supply and energy storage unit of embodiments of the inventive auxiliary power supply arrangement are measured. In an embodiment, the capacity of the standby power supply of the inventive auxiliary power supply arrangement is at most 20% of the reference capacity. For example, with embodiments of the inventive arrangement, a relatively economical and compact 30 kVA diesel genset could provide standby power to a configuration of auxiliary devices for a required duration (24 hours, 48 hours, etc.). If the same configuration of auxiliary devices were to be powered for the same duration by a single diesel genset as known from the conventional art, a much larger and costlier 150 kVA diesel genset would be required.

In an exemplary embodiment of the invention, neither the energy storage unit nor the standby power supply are rated to cover the peak power requirements of the auxiliary devices. Instead, the energy storage unit is configured to supplement the standby power supply in covering the peak power requirements of the auxiliary devices. An advantage of this configuration is that neither power supply needs to be rated for the peak auxiliary load: the standby power supply need only be rated for the steady-state power consumption, and the energy storage unit need only cover the marginal power demand beyond the capability of the standby power supply.

In an embodiment of the invention, the energy storage unit has an energy storage capacity in the order of 5 kWh-1 MWh, depending on how the standby power supply is realized. In an embodiment of the invention, the energy storage unit is configured to deliver power in the order of 50 kVA-400 kVA, depending on how the standby power supply is realized.

As indicated above, the standby power supply of embodiments of the inventive auxiliary power supply arrangement can be a diesel generator that is smaller and more economical than a diesel generator that would otherwise be required to provide the reference power capacity. A standby power supply realized as a diesel generator will, of course, require refueling at some point. However, the standby power supply of embodiments of the inventive arrangement does not need to provide a consistent or constant level of power but can provide fluctuating power levels so long as its average delivered power is no less than the steady state power consumption of the auxiliaries. The standby power supply therefore does not need to be a diesel genset, and alternative realizations are possible. In an embodiment of the invention, the standby power supply can be a wave power device such as a point absorber buoy anchored near an offshore wind turbine. Equally, the standby power supply can be realized as any of a small gas turbine, a fuel cell, a compressed-air system, a large-capacity rechargeable battery, a photovoltaic arrangement, etc., and may even comprise any suitable combination of such power supply units. Depending on its energy source(s), the standby power supply may be essentially "inexhaustible", i.e., it is continually replenished by an energy source. The standby power supply can comprise a large-capacity energy storage unit utilizing hydrogen produced by an electrolysis arrangement powered by compressed air, wind energy, a battery module, etc.

The energy storage capacity of the standby power supply is favorably large, and its power capacity can be favorably low, since it only needs to cover the steady-state consumption of the auxiliaries. The additional energy storage unit will ensure that any transient or peak power consumption is covered.

The energy storage unit of embodiments of the inventive auxiliary power supply arrangement can be any device that can provide a large quantity of power over a short duration, since its purpose is to cover demand during peaks of the wind turbine auxiliary devices. In an embodiment of the invention, the energy storage unit comprises a battery arrangement such as a lithium-ion battery system, a super-capacitor system or a combination of such systems.

Together, the standby power supply and the energy storage unit ensure that the wind turbine auxiliary devices are provided with the power they require during an off-grid state. Of course, the energy storage unit is only needed when power demand exceeds the power being covered by the standby power unit. The energy storage unit is deployed only when the power required by the auxiliaries exceeds the power being delivered in that instant by the standby power supply. The only requirement of the standby power supply is that its "long-run average" is slightly higher than the steady-state average consumption of the auxiliaries. Whenever power consumption rises above this steady-state level, the energy storage unit can commence feeding power to the auxiliary devices, i.e., the energy storage unit can discharge power. This can be achieved by connecting the standby power supply and the energy storage unit in a suitable configuration.

In an embodiment, the energy storage unit is connected in series with the standby power supply, i.e., in an inline arrangement. In an alternative embodiment, the energy storage unit is connected in parallel with the standby power supply, i.e., in a line-interactive arrangement.

The elements of the auxiliary power supply arrangement may, for example, comprise suitable controllers and/or power electronics to respond to fluctuations in system voltage or frequency. The standby power supply and energy storage unit of the auxiliary power supply arrangement may, for example, collectively regulate their power output to maintain a stable system voltage or frequency. Fluctuating power consumption by the auxiliaries will result in fluctuations in system voltage or frequency, which are compensated by the collective performance of the standby power supply and energy storage unit. For example, should the standby power supply be unable to cover the requirements of the auxiliaries, the controllers and/or power electronics respond to initiate discharging of the energy storage unit to cover the deficit, thereby restoring the system voltage or frequency to its nominal level.

Similarly, if the momentary power consumption of the auxiliary devices is less than the power being provided by the standby power supply, the energy storage unit will recharge from the standby power supply so that, at some later point in time, it will be able to cover the demand of a power peak or transient. As long as recharging the energy storage unit does not decrease the system voltage or frequency, a controller or regulator of the energy storage unit will regulate the recharging procedure.

In an embodiment of the invention, the wind turbine is provided with a monitoring unit (comprising any suitable controllers and/or power electronics) configured to monitor relevant quantities such as the power consumption of the auxiliaries, the capacity of the standby power supply, the capacity of the energy storage unit, etc. Such a monitoring unit may communicate with the wind turbine controller, which can issue commands as appropriate, for example to reduce power consumption of one or more of its auxiliary devices in order to ensure that the wind turbine can continue to remain operational until the grid is once again restored.

In an embodiment of the invention, the inventive auxiliary power supply arrangement is configured to supply power to multiple wind turbines. For example, a suitably-scaled embodiment of the auxiliary power supply arrangement may be provided at a wind park substation to provide standby power to all auxiliaries in the event of a grid outage. Such an auxiliary power supply arrangement could provide power to the wind turbine auxiliaries via a network of inter-array cables through the wind park. The standby power supply may comprise any number of units that collectively cover the average power requirements of auxiliary devices of the wind turbines. An energy storage arrangement can comprise any number of energy storage units, which collectively cover transient power requirements of the auxiliary devices and/or supplement the standby power supply in covering the transient power requirements of the auxiliary devices.

BRIEF DESCRIPTION

Some of the embodiments will be described in detail, with references to the following Figures, wherein like designations denote like members, wherein:

FIG. 3 shows an offshore wind turbine equipped with an auxiliary power supply arrangement according to embodiments of the invention;

FIG. 5 shows a alternative configuration of the auxiliary power supply arrangement according to embodiments of the invention;

FIG. 6 shows an alternative configuration of the auxiliary power supply arrangement according to embodiments of the invention;

DETAILED DESCRIPTION

Figure 1:
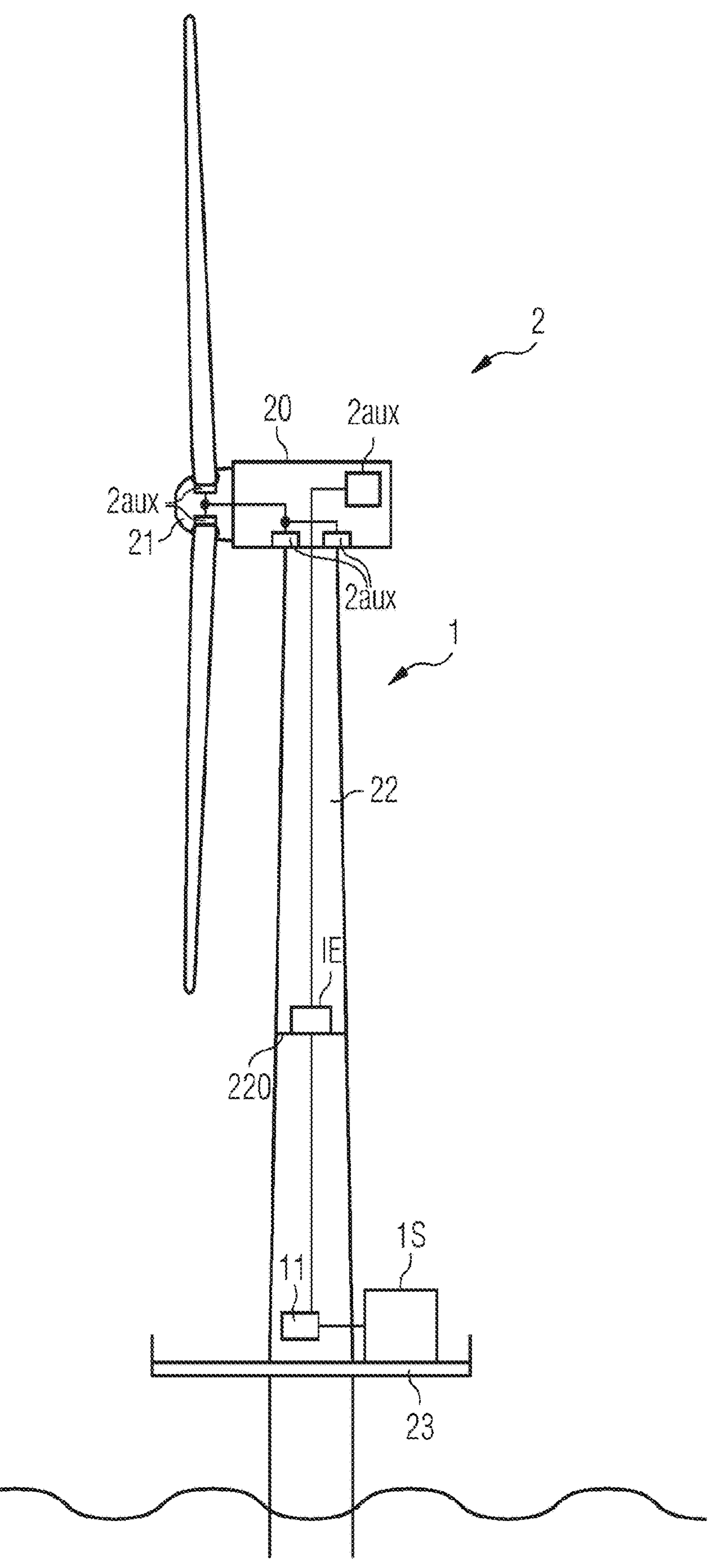
FIG. 1 shows an offshore wind turbine equipped with an auxiliary power supply arrangement according to embodiments of the invention.
Figure 2:
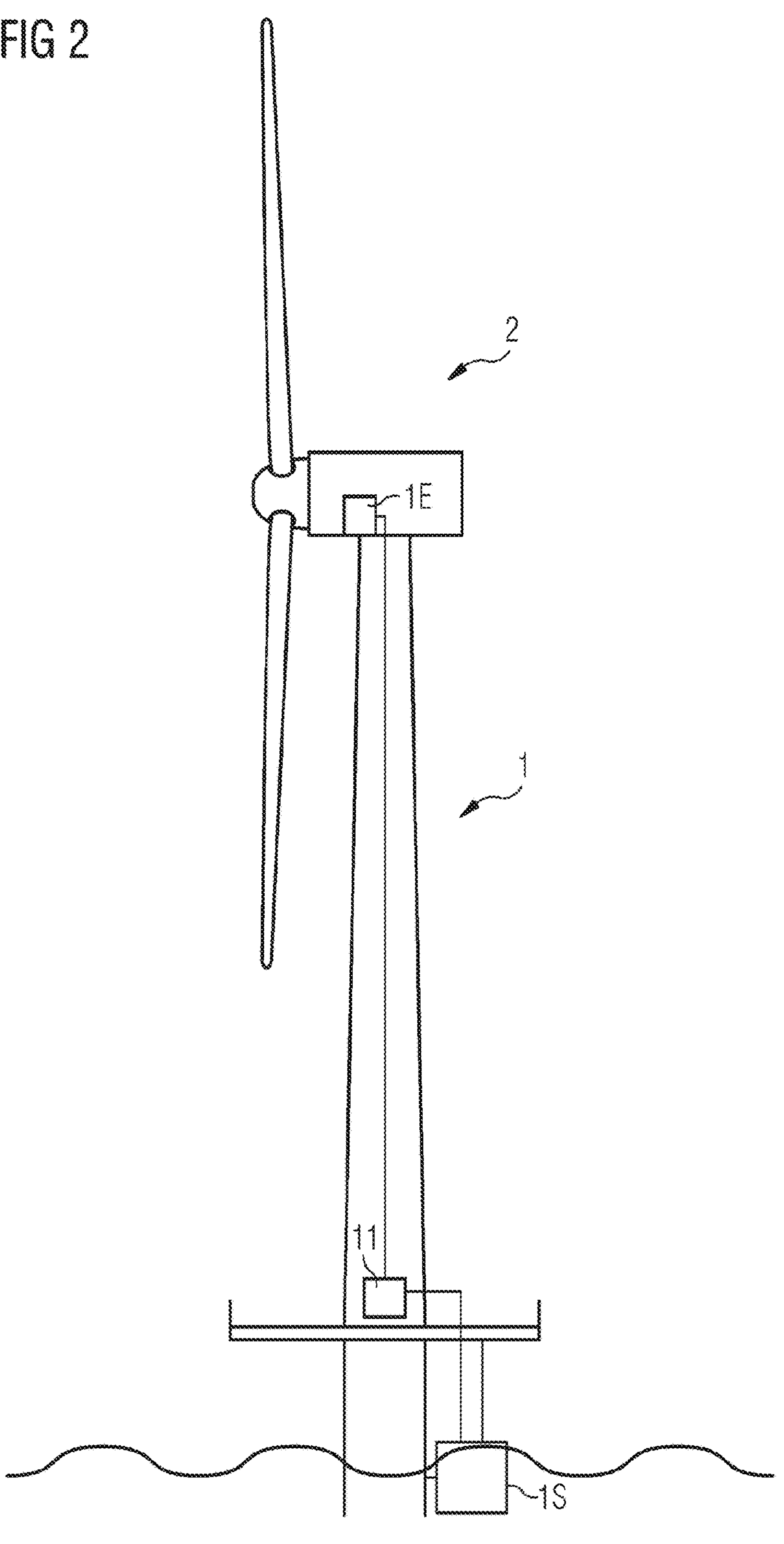
FIG. 2 shows an offshore wind turbine equipped with an auxiliary power supply arrangement according to embodiments of the invention.
Figure 3:
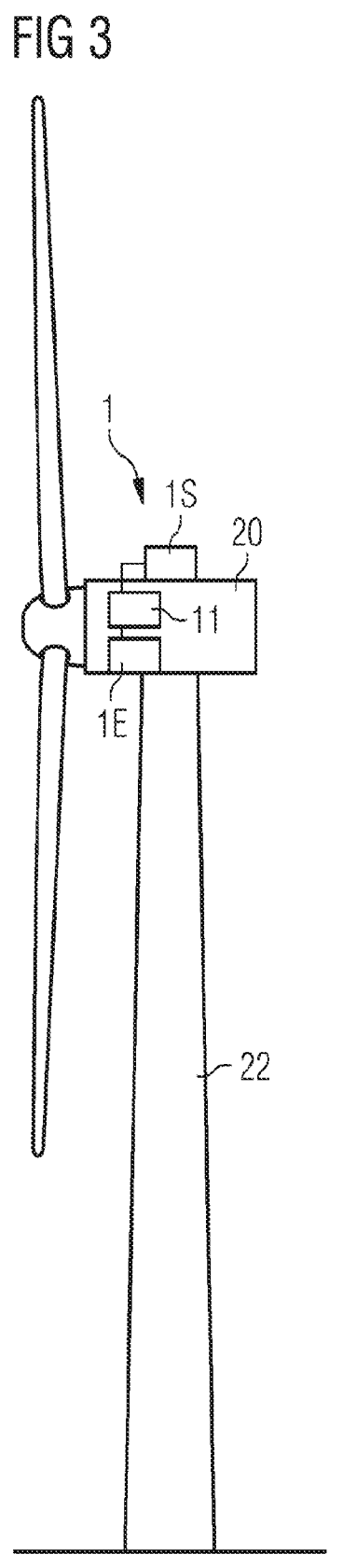

FIGS. 1-3 show an offshore wind turbine 2 equipped with an auxiliary power supply arrangement 1 according to embodiments of the invention. In each case, the auxiliary power supply arrangement 1 comprises a standby power supply 1S configured to supply the average power required by auxiliary devices $\mathbf{2}_{aux}$ of the wind turbine 2, and an energy storage unit 1E configured to supply peak power or supplement the supply of peak power required by the auxiliary devices $\mathbf{2}_{aux}$. The auxiliary devices $\mathbf{2}_{aux}$ can be permanently installed device such as yaw motors, pitch motors, climate control arrangement etc., or temporarily required tools and/or equipment, and can be distributed in various locations throughout the wind turbine 2, for example inside the nacelle 20, in the hub 21, in the tower, on a tower platform, etc. In FIG. 1, the standby power supply 1S is located on an external platform 23 and can be a diesel genset for example. The energy storage unit 1E is arranged on a platform 220 in the tower 22. The standby power supply 1S and the energy storage unit 1E are connected by a socket 11. In FIG. 2, the standby power supply 1S is a wave power device secured to a supporting structure of the wind turbine. Here, the energy storage unit 1E is arranged inside the nacelle 20, and the auxiliary power supply arrangement 1 provides power to the same arrangement of auxiliary devices $\mathbf{2}_{aux}$ (not shown). In FIG. 3, the standby power supply 1S is arranged on top of the nacelle and can be a photovoltaic module. The standby power supply 1S, as explained above, can comprise one or more modules that collectively provide standby power to the auxiliaries.

Figure 4:
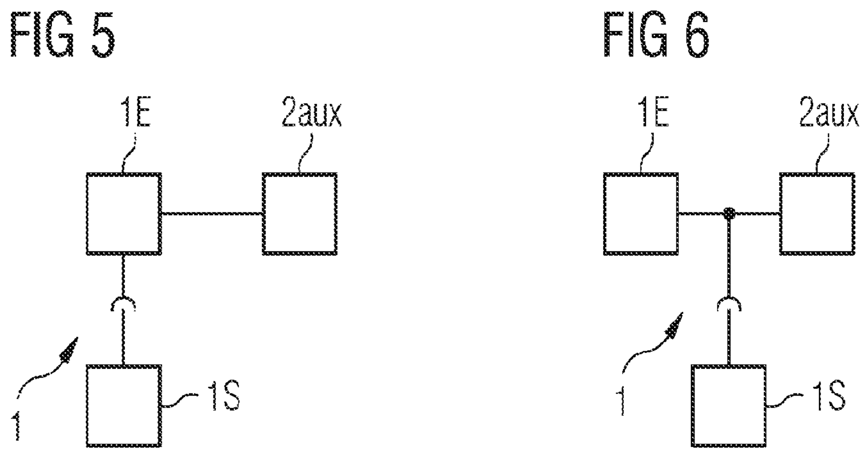
FIG. 4 shows an embodiment of the inventive auxiliary power supply arrangement according to embodiments of the invention.

In any of the above configurations, the energy storage unit 1E can be a battery such as a lithium-ion battery and can be located as indicated in the tower interior or inside the nacelle 20. The devices are connected by a socket 11 as shown in FIG. 4. The energy storage unit 1E is to contribute power to the auxiliary devices $\mathbf{2}_{aux}$ when their peak power consumption exceeds the power produced by the standby power supply 1S. A monitoring unit 10 can keep a wind turbine controller (WTC) informed of the total capacity of the auxiliary power supply arrangement 1, so that the WTC can—if necessary—issue commands to reduce power consumption of one or more auxiliary devices $\mathbf{2}_{aux}$ in order to ensure that the wind turbine 2 can remain operational until it is once again connected to the grid. The monitoring unit 10 can be part of the auxiliary power supply arrangement 1.

The standby power supply 1S and the energy storage unit 1E can be connected in series as shown in FIG. 5. Alternatively, the standby power supply 1S and the energy storage unit 1E can be connected in parallel as shown in FIG. 6.

Figure 7:
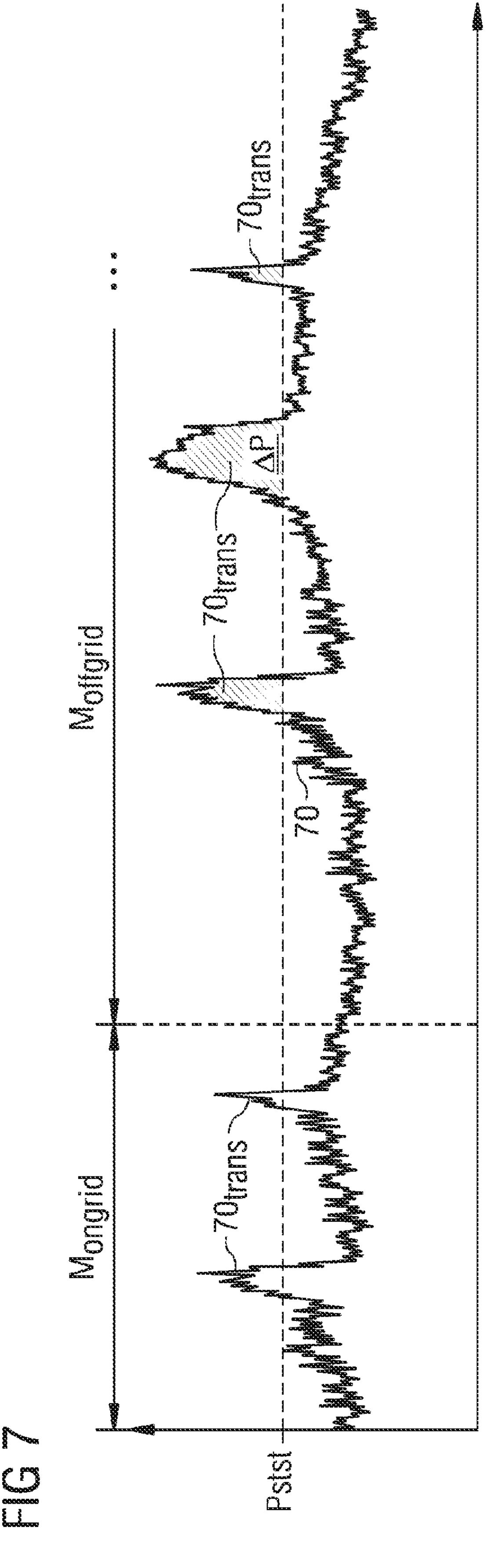
FIG. 7 shows power provided to the auxiliary devices of a wind turbine equipped with an embodiment of the inventive auxiliary power supply arrangement.

During an on-grid mode $M_{ongrid}$ operation of the wind turbine, power is supplied to the auxiliary devices $\mathbf{2}_{aux}$ by the wind turbine itself or by the grid as shown in FIG. 7. The diagram indicates a fluctuating power demand 70. The demand of the auxiliary devices $\mathbf{2}_{aux}$ is regularly below an average or steady-state level $P_{stst}$. Occasionally, the auxiliary devices $\mathbf{2}_{aux}$ draw a high current as indicated by the brief transients or peaks $\mathbf{70}_{trans}$, for example resulting from high inrush currents drawn by a yaw motor or pitch motor upon startup. During the on-grid mode $M_{ongrid}$, the power peaks $\mathbf{70}_{trans}$ are easily covered by the essentially unlimited grid power.

However, in an off-grid mode $M_{offgrid}$, power to the auxiliary devices $\mathbf{2}_{aux}$ must be supplied by the standby power supply 1S and the energy storage unit 1E. The power peaks $\mathbf{70}_{trans}$ are no longer covered by a limitless power supply, but by the comparatively small standby power supply 1S and energy storage unit 1E of FIGS. 1-4. The average or steady-state power $P_{stst}$ is covered by the standby power supply 1S. When auxiliary devices draw a high current, the standby power supply 1S is not required to cover the power peak, and instead the deficit $\Delta P$ is made up by the energy storage unit 1E, which discharges power as required during the peak $\mathbf{70}_{trans}$ until power consumption is once again at or below the power level $P_{stst}$ delivered by the standby power supply. Whenever power consumption is below that power level $P_{stst}$, the energy storage unit 1E may be recharged from the standby power supply 1S, as necessary.

Figure 8:
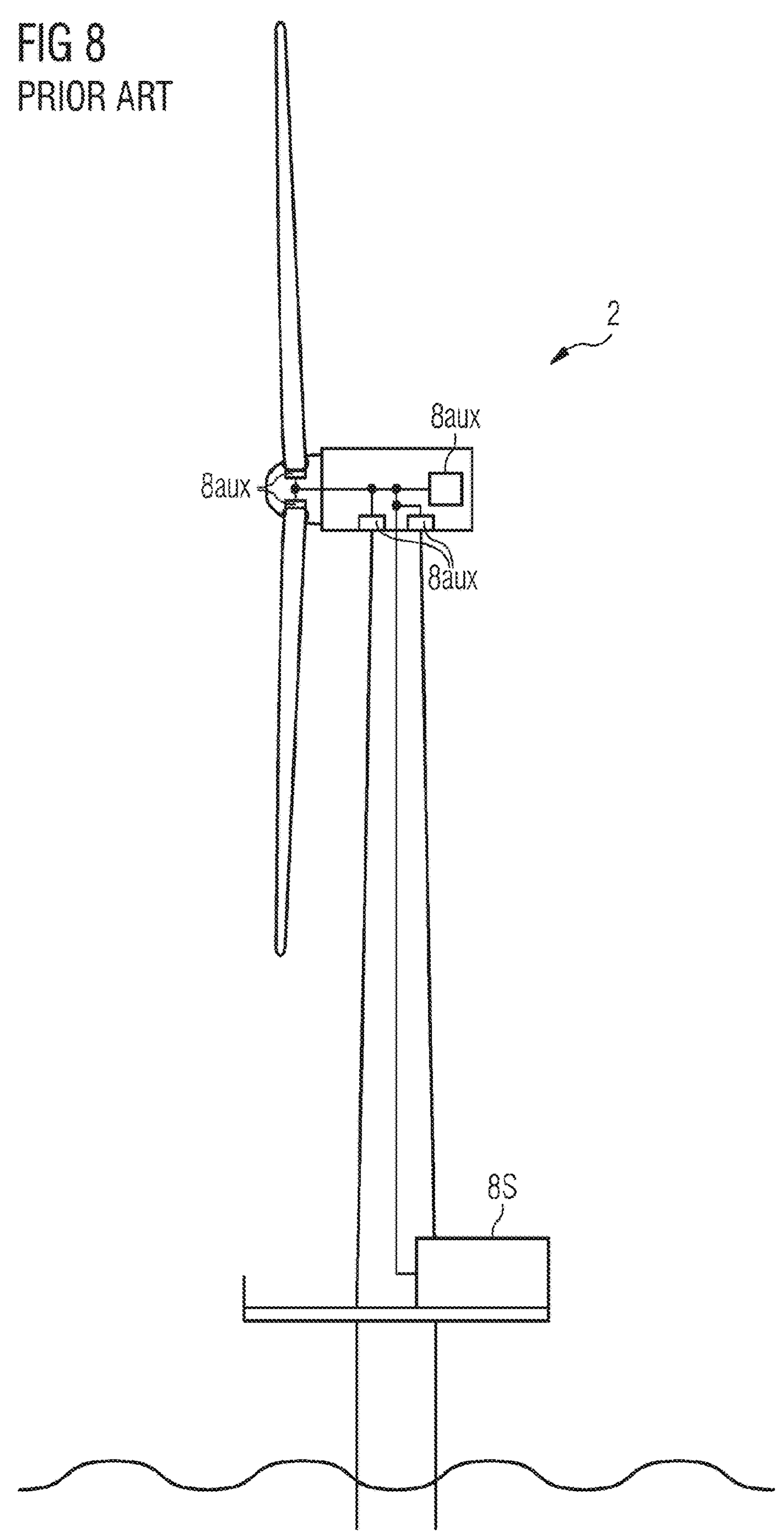
FIG. 8 shows a wind turbine equipped with a conventional art standby power supply.

FIG. 8 shows a wind turbine 2 with a conventional art standby power supply 8S. The specification of the standby power supply 8S is based on the peak power consumption that must be covered when an auxiliary device $\mathbf{8}_{aux}$ draws a high "inrush" current for a brief period as explained above.

Figure 9:
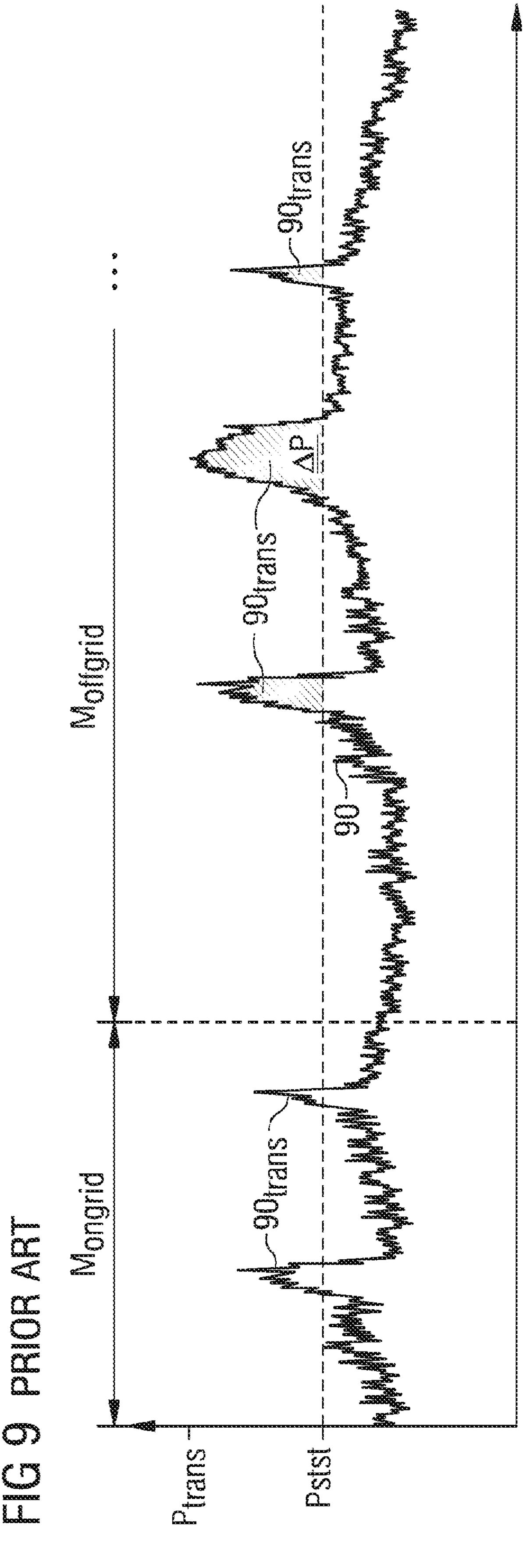
FIG. 9 shows power supply to the auxiliary devices of the wind turbine of FIG. 8.

FIG. 9 illustrates the management of conventional art auxiliary power for the wind turbine of FIG. 8. When the wind turbine 2 is operated in an off-grid mode $M_{offgrid}$, power to the auxiliary devices must be supplied by the standby power supply 8S. The diagram indicates a fluctuating power demand 90. Here also, while the demand of the auxiliary devices $\mathbf{8}_{aux}$ is regularly below an average level $P_{stst}$, an auxiliary device may occasionally draw a high current as indicated by the peaks $\mathbf{90}_{trans}$, wherein $P_{trans}$ denotes a highest peak of the peaks $\mathbf{90}_{trans}$. Any such peak demand must be covered by the standby power supply 8S alone, so that the capacity of the standby power supply 8S must be accordingly large, for example in the order of 150 kVA-400 kVA.

Figure 10:
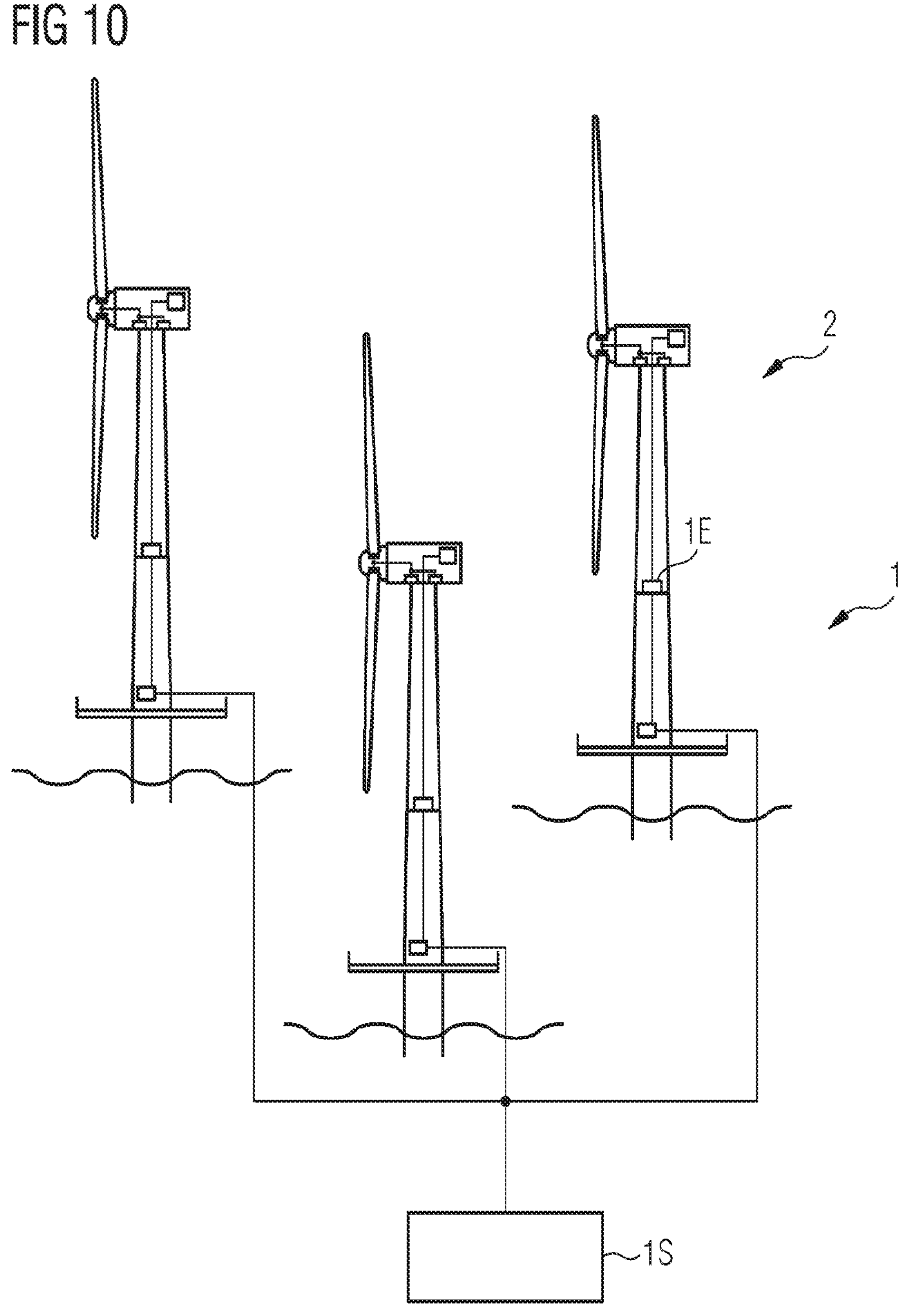
FIG. 10 shows a further embodiment of the invention.

FIG. 10 shows a further embodiment of the invention, in which the inventive auxiliary power supply arrangement 1 is configured to supply power to multiple wind turbines 2. A scaled-up standby power supply 1S may be provided at a wind park substation to provide standby power to all auxiliaries $\mathbf{2}_{aux}$ of all wind turbines 2 in the event of a grid outage. Such an auxiliary power supply arrangement 1 can provide standby power to the wind turbines 2 over a suitable network of power cables connecting the wind turbines of the wind park. Of course, the standby power supply 1S can comprise any number of units that collectively cover the average power requirements of the auxiliary devices of the wind turbines 2. The energy storage arrangement can comprise any number of energy storage units 1E, for example an energy storage unit 1E local to each wind turbine 2 as shown here, to cover transient power requirements of the auxiliary devices $\mathbf{2}_{aux}$ as explained above.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An auxiliary power supply arrangement of a wind turbine, comprising:

a standby power supply configured to supply sufficient power to cover the average steady state power requirements of auxiliary devices of the wind turbine when the wind turbine is operating in an off-grid mode, wherein the standby power supply is one device; and an energy storage unit, wherein the energy storage unit is configured to cover peak transient power requirements of the auxiliary devices and/or to supplement the standby power supply in covering the peak transient power requirements of the auxiliary devices, wherein the auxiliary devices comprise devices required temporarily during stages of installation, commissioning, or maintenance, and wherein the standby power supply has a capacity that is less than a reference capacity that covers the peak transient power requirements of the auxiliary devices.

2. The auxiliary power supply arrangement according to claim 1, wherein the energy storage unit is a rechargeable energy storage module.

3. The auxiliary power supply arrangement according to claim 2, wherein the energy storage unit comprises a lithium-ion battery or a supercapacitor arrangement.

4. The auxiliary power supply arrangement according to claim 1, wherein the energy storage unit has an energy storage capacity in a range of 5 kWh-1 MWh and a rated apparent power output in a range of 50 kVA-400 kVA.

5. The auxiliary power supply arrangement according to claim 1, wherein the standby power supply generates power from a renewable energy source.

6. The auxiliary power supply arrangement according to claim 1, wherein the standby power supply comprises a photovoltaic arrangement, a gas turbine, a fuel cell, a wave energy converter, a compressed-air energy storage module, or a diesel generator.

7. The auxiliary power supply arrangement according to claim 1, wherein the energy storage unit and the standby power supply are connected in an inline arrangement.

8. The auxiliary power supply arrangement according to claim 1, wherein the energy storage unit and the standby power supply are connected in a line-interactive arrangement.

9. A wind turbine comprising:

an aerodynamic rotor mounted to a hub;

a nacelle mounted on a tower;

a generator arranged in the nacelle;

a number of auxiliary devices; and an auxiliary power supply arrangement according to claim 1 configured to supply power to the auxiliary devices during an off-grid state of the wind turbine.

10. The wind turbine according to claim 9, comprising a monitoring unit configured to monitor power consumed by the auxiliary devices.

11. The wind turbine according to claim 10, wherein the monitoring unit is configured to control the operation of an auxiliary device of the auxiliary devices on the basis of data provided by the monitoring unit.

12. A method of operating the wind turbine according to claim 9, said method comprising:

detecting the off-grid state;

controlling the standby power supply of the auxiliary power supply arrangement to cover the average power requirements of the auxiliary devices; and discharging the energy storage unit to cover transient power requirements of the auxiliary devices.

13. The method according to claim 12, wherein the energy storage unit is recharged when power consumption of the auxiliary devices is below the output power capacity of the standby power supply.

14. The auxiliary power supply arrangement according to claim 1, wherein the standby power supply and the energy storage unit are connected to each other by a socket such that the standby power supply and the energy storage unit are each directly connected to the socket.

15. The auxiliary power supply arrangement according to claim 14, comprising a monitoring unit configured to monitor power consumed by the auxiliary devices, wherein the monitoring unit is connected to the standby power supply and the energy storage unit by the socket, and wherein the monitoring unit is directly connected to the socket.

16. The auxiliary power supply arrangement according to claim 1, wherein the capacity of the standby power supply is rated to cover only the average steady state power requirements of the auxiliary devices.

17. The auxiliary power supply arrangement according to claim 1, wherein the capacity of the standby power supply is at most 20% of the reference capacity.

18. The auxiliary power supply arrangement according to claim 1, wherein the auxiliary devices comprise devices required temporarily during stages of installation or commissioning.

* * * * *